United States Patent [19]
Ladan et al.

[11] Patent Number: 5,263,396
[45] Date of Patent: Nov. 23, 1993

[54] REMOTE CONTROL SYSTEM FOR COMBAT VEHICLE

[75] Inventors: Uri Ladan, Petach Tikva; Talmon Rabinovitch, Kfar Saba; Yoav Fallach, Beer-Sheva, all of Israel

[73] Assignee: Israel Aircraft Industries, Ltd., Lod, Israel

[21] Appl. No.: 578,121

[22] Filed: Sep. 5, 1990

[30] Foreign Application Priority Data

Sep. 26, 1989 [IL] Israel ......................................... 91779

[51] Int. Cl.$^5$ .............................................. F41G 5/06
[52] U.S. Cl. .................................... 89/1.11; 89/41.05
[58] Field of Search ........................ 89/1.1, 36.08, 1.1, 89/40.03, 41.05; 102/362

[56] References Cited

U.S. PATENT DOCUMENTS

| | | | |
|---|---|---|---|
| 2,359,032 | 9/1944 | Gott .................... | 89/41.05 |
| 3,504,122 | 3/1970 | Ratliff, Jr. .............. | 89/41.05 |
| 3,711,638 | 1/1973 | Davies .................. | 89/41.05 |
| 4,004,487 | 1/1977 | Eichweber ............... | 89/1.815 |
| 4,126,312 | 11/1978 | Kreuzer et al. ........... | 89/36.08 |
| 4,621,562 | 11/1986 | Carr et al. ............... | 89/41.05 |
| 5,016,004 | 5/1991 | Funk et al. .............. | 180/6.48 |

FOREIGN PATENT DOCUMENTS

| | | |
|---|---|---|
| 3222970 | 12/1983 | Fed. Rep. of Germany ..... 89/41.05 |
| 3405015 | 8/1985 | Fed. Rep. of Germany ..... 89/41.05 |

OTHER PUBLICATIONS

Hamel, W. R., and Shoemaker, C. M., RF Alternatives to Fiber Optics in Unmaned Ground Vehicles in Proc. 16th Annual AUVS Symposium, Washington, D.C., Jul. 1989.

Klarer, P. R., Autonomous Land Navigation a Demonstration of Retrotraverse, in Proc. of the 16 Annual AUVS Symp., Washingtono, DC., Ju. 1989.

Kraetz, W. F., and Krantz, D. G., Design of a realistic Feedback System for Controlling a Teleoperatored Land Vehicle, in Proc. of the 16th. Annual AUVS Symp., Washington, D.C, Jul. 1989.

Stokes, K. W., Remote Control Target Vehicles for Operational Testing, Presented to Assoc. Unmanned Vehicle Sys. Symp., Jul. 1989, Wash. D.C.

Primary Examiner—Stephen Johnson
Attorney, Agent, or Firm—Ladas & Parry

[57] ABSTRACT

A remote control system for a combat vehicle including remote control apparatus for providing signals to the vehicle for controlling a plurality of vehicle functions conventionally controlled by personnel riding in the vehicle; selectably actuable vehicle mounted apparatus for receiving the signals from the remote control apparatus and for operating the plurality of vehicle functions in accordance with the signals; and apparatus for selectably deactivating the vehicle mounted apparatus so as to enable non-remote control of the vehicle functions.

12 Claims, 10 Drawing Sheets

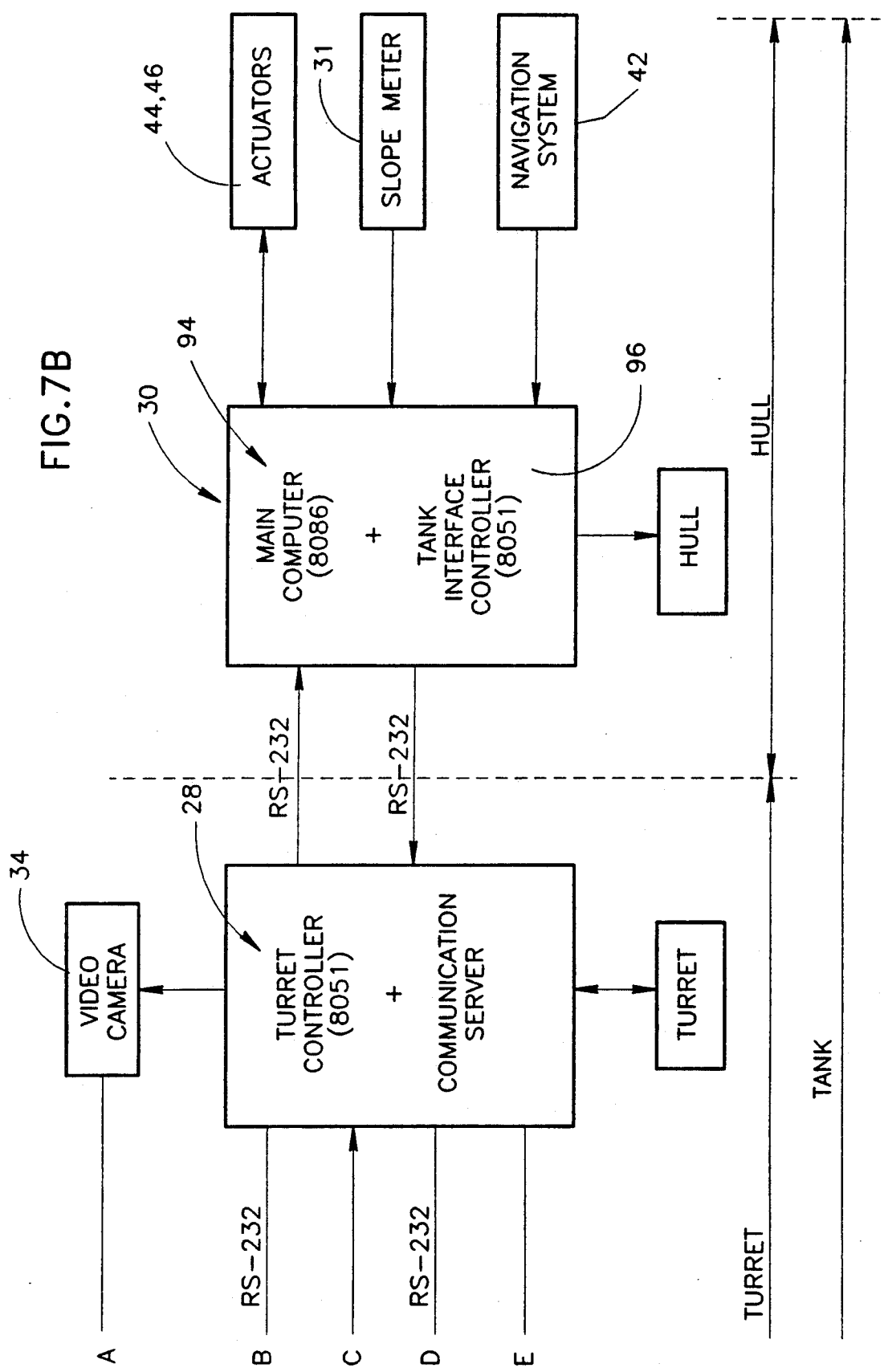

REMOTE CONTROL SYSTEM FOR COMBAT VEHICLE

FIELD OF THE INVENTION

The present invention relates generally to combat vehicles, such as tanks and, particularly, to remotely controllable combat vehicles.

BACKGROUND OF THE INVENTION

In modern warfare it has become increasingly common to employ remotely controllable battle or surveillance vehicles. A particular advantage of such vehicles is that they can be employed to carry out potentially dangerous tasks and thus enable a significant reduction in human casualties.

A system employing driverless combat vehicles as operational targets was developed by Kaman Sciences Corporation in the late 1970's. A presentation of this system, entitled "Remote Control Target Vehicles For Operational Testing", was made by Keith W. Stokes to the Association for Unmanned Vehicles Systems Symposium, Jul. 17–19, 1989, Washington D.C., U.S.A.. The system uses three RF (radio frequency) transponders placed in a triangular arrangement so as to form the periphery of a desired operational area. Navigational control of a vehicle is exercised via the Rf transponders. The vehicle control system employs a receiver, a microprocessor based controller and servo actuators.

The above-described system requires a prepared area and cannot, therefore, be employed in actual combat. The vehicles employed, furthermore, are dedicated vehicles, and serve only as target vehicles.

A further dedicated, special purpose robotic vehicle, known as ROBAT (Robotic Obstacle Breaching Assault Tank) was developed as a lead vehicle for dangerous battlefield situations. The ROBAT was developed by TACOM of the U.S. Army.

SUMMARY OF THE INVENTION

The present invention seeks to provide a system for converting a combat vehicle into a remotely-controllable combat vehicle, while not interfering with the capacity of the vehicle to be operated in a fully-manned, non-remote controlled mode.

There is provided, therefore, according to an embodiment of the present invention, a remote control system for a combat vehicle including remote control apparatus for providing signals to the vehicle for controlling a plurality of vehicle functions conventionally controlled by riding in the vehicle; selectably actuable vehicle mounted apparatus for receiving the signals from the remote control apparatus and for operating the plurality of vehicle functions in accordance with the signals; and apparatus for selectably deactivating the vehicle mounted apparatus so as to enable non-remote control of the vehicle functions.

There is also provided, according to an alternative embodiment of the invention, a remotely controllable combat vehicle system including a combat vehicle and a remote control system for the combat vehicle, the remote control system including remote control apparatus for providing signals to the vehicle for controlling a plurality of vehicle functions conventionally controlled by personnel riding in the vehicle; selectably actuable vehicle mounted apparatus for receiving the signals from the remote control apparatus and for operating the plurality of vehicle functions in accordance with the signals; and apparatus for selectably deactivating the vehicle mounted apparatus so as to enable non-remote control of the vehicle functions.

Additionally in accordance with an embodiment of the invention, the remote control apparatus includes apparatus for transmitting the signals to the vehicle mounted apparatus; signal receiving apparatus; and apparatus, associated with the signal receiving apparatus, for providing an output indication of the operation of the vehicle, the vehicle mounted apparatus including apparatus for operating each of a predetermined plurality of vehicle functions; apparatus for monitoring each of the predetermined plurality of vehicle functions; and signal processing apparatus for receiving the signals transmitted from the remote control apparatus and for providing first output signals, in accordance with the transmitted signals, to the apparatus for operating so as to cause operation of selected vehicle functions, the signal processing also being operative to communicate with the apparatus for monitoring and to provide second output signals, indicative of the operation of the vehicle, to the signal receiving apparatus of the remote control apparatus.

Further in accordance with an embodiment of the invention, the vehicle mounted apparatus also includes visual surveillance apparatus for surveying an area visible from the combat vehicle; and apparatus, associated with the surveillance apparatus, for transmitting a video output, the remote control apparatus also including apparatus for receiving the video output; and apparatus, associated with the apparatus for receiving, for providing a visual display corresponding to the video output.

BRIEF DESCRIPTION OF THE DRAWINGS

The present invention will be more fully understood and appreciated from the following detailed description, taken in conjunction with the drawings, in which:

FIGS. 7A–7B collectively constitute a block diagram representation of the hardware employed in an embodiment of the invention;

DETAILED DESCRIPTION OF THE INVENTION

Figure 1:
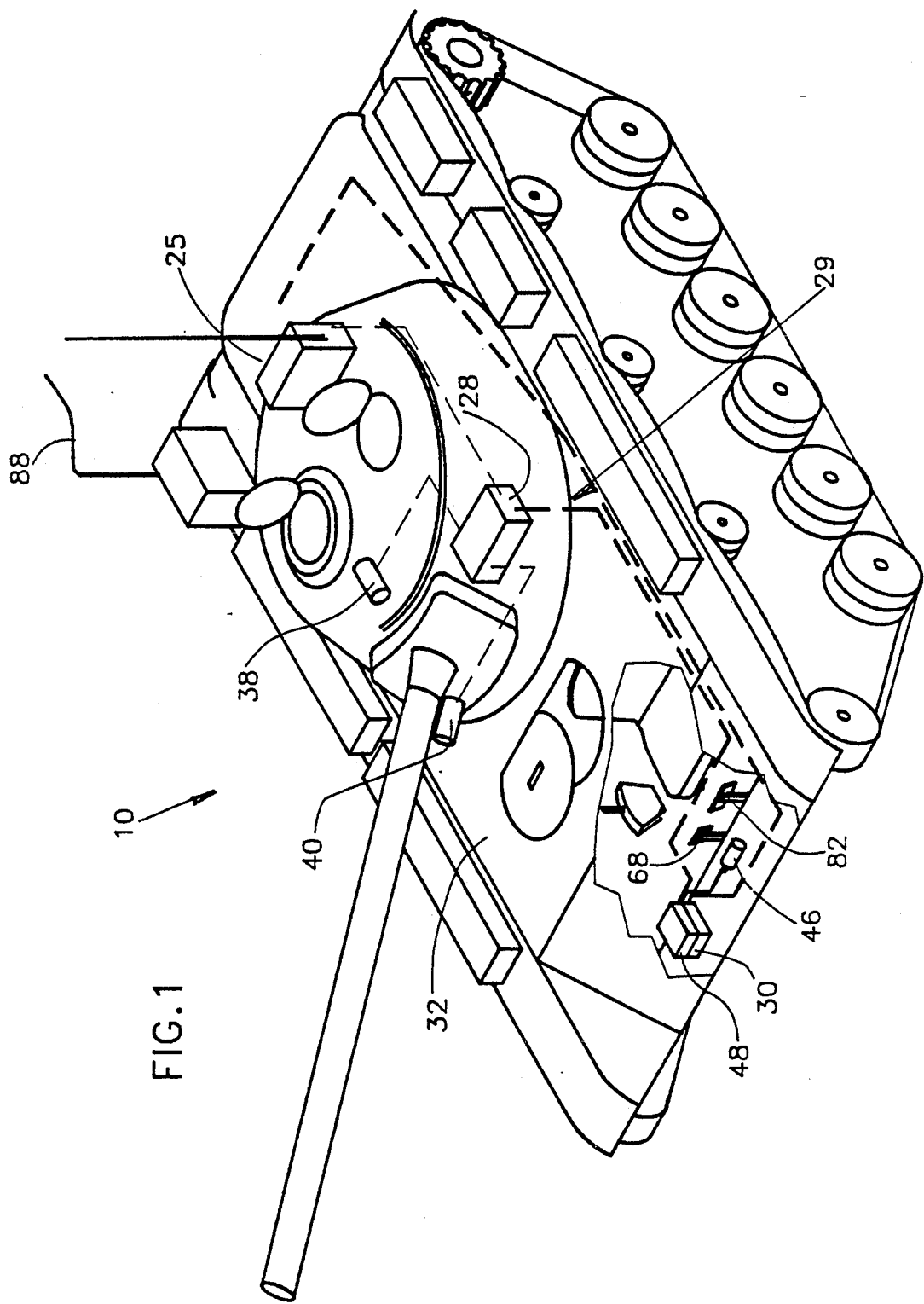
FIG. 1 is a schematic illustration of a combat vehicle employing the remote control system of the present invention.

Reference is now made to FIG. 1, in which is illustrated a combat vehicle 10, employing a remote control system, constructed and operative according to an embodiment of the present invention. The illustrated combat vehicle 10 may, for example, be a main battle tank (MBT) such as an M-1 or M-60 tank, although the remote control system of the present invention may be adapted for use with any other suitable vehicle.

Figure 2:
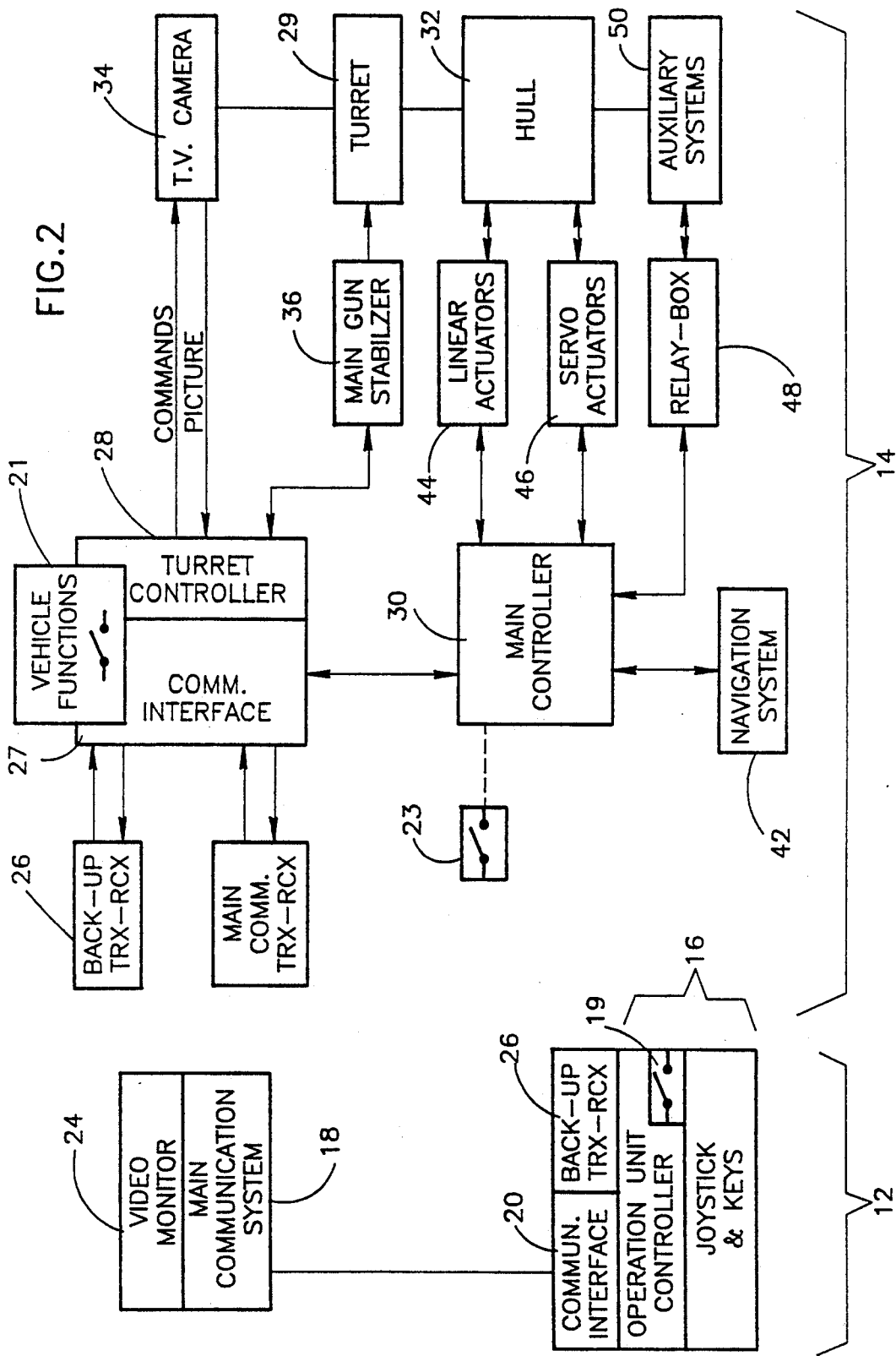
FIG. 2 is a block diagram representation of the combat vehicle and remote control system of FIG. 1.

Referring now to FIG. 2, the system of the present invention includes a remote control unit, referenced generally 12, by which an operator is able to govern and monitor the operations of the vehicle; and a vehicle mounted unit, referenced generally 14, by which a plurality of received signals transmitted from the remote control unit are converted to provide commands effective to activate any of a predetermined plurality of vehicle functions.

A particular feature of the present invention is that although, as described, the vehicle mounted unit 14 is, when activated, operative to enable remote control of the vehicle, there is also provided selectably operable apparatus for deactivating the vehicle mounted unit, so as to permit conventional, non-remote control of the vehicle. Switching of the vehicle between remote-controlled and conventional modes is facilitated by first switch apparatus 19 associated with the operator control unit 16 (described below), and second switch apparatus 21 associated with the vehicle mounted unit 14.

Once the first switch apparatus 19 has been moved so as to, for example, activate the vehicle mounted unit 14, the second switch apparatus 21 is operative to activate various motive functions of the vehicle, such as fuel, transmission etc.., and thus enable remote controlled operation of the vehicle. Operation of the first switch apparatus 19 to deactivate the vehicle causes the various vehicle functions to be operatively disconnected from the remote control system and second switch apparatus 21 is then operated so as to enable conventional operation of the vehicle. The above-described switching capability permits switching of the vehicle between the remote-controlled and conventional modes in a very short time, typically less than a minute.

According to a preferred embodiment of the invention, there is also provided a back-up switch 23, which enables switching of the vehicle to a conventional mode of operation, in the event of loss of remote control of the vehicle from the remote control unit 12.

Remote control unit 12 includes apparatus for transmitting command signals to and receiving input from the vehicle mounted unit 14 and includes a control unit 16 connected to a main communications system 18 via an appropriate interface 20. The main communications system includes video, audio, and data transmitter and receiver apparatus, shown schematically at block. The apparatus depicted in block is described in greater detail hereinbelow, in conjunction with FIG. 8. Remote control apparatus 12 also includes a video monitor 24 for displaying the video and data information transmitted from the vehicle mounted unit.

Also shown, at blocks 26, is back-up transmitter and receiver apparatus for permitting the transmitting and receiving, of data only, between the remote control unit and the vehicle mounted unit in the event that the main communications system breaks down. Such back-up apparatus is provided in many modern tanks, a typical transmitter and unit being U.S. F.S.N. 5820-892-0623 and a typical receiver unit being U.S. F.S.N. 5820-892-0624, such as employed in the M-60 tank.

The function of the vehicle mounted unit 14 is to operate the vehicle according to commands received from the remote control unit 12 and to provide the operator with information concerning the operation of the vehicle, via the main communications system 18 and video monitor 24 of the remote control unit 12.

Referring now also to FIG. 1, command signals transmitted from the remote control unit 12 are received by the vehicle mounted unit 14 via a receiver 25 (also FIGS. 7 and 8) and they are directed, via an appropriate interface 27 (FIG. 2), to either a turret controller 28 or a main controller 30. The respective functions of the turret controller and the main controller are now described.

The turret controller 28 is an 8051 computer and is used for controlling the movement of the turret 29 of the vehicle relative to its hull 32, thereby also controlling the movement of one or more turret mounted television cameras, depicted schematically at block 34 (FIG. 2). The turret controller is also operative to control the main gun stabilizer 36 (FIG. 2), as known in the art.

According to a preferred embodiment of the invention, and as illustrated in FIG. 1, there are provided two television cameras, of which a first one 38 is used for monitoring the terrain immediately in front of the vehicle and thus serves as a 'driving' camera. A second camera 40, typically having a much wider field of view than the first one, is used primarily for surveillance purposes. Typical television cameras used may be of the color CCTV type manufactured under the PANASONIC trademark by MATSUSHITA, P.O.B. 288, Central Osaka, Japan. Typical lenses useful in conjunction with the television camera are FUJINON CCTV lenses, manufactured by FUJI, Japan.

The main controller 30, which typically is an 8086 computer, as shown in FIG. 7, is operative to govern the motive functions of the vehicle. As indicated by box 42 (FIG. 2), the vehicle mounted unit 14 includes a system for navigating the vehicle. The navigation system is preferably an inertial system, such as the LANS (Land Navigation System), manufactured by Israel Aircraft Industries Ltd., Electronics Division, Tamam, Israel, and receives input, inter alia, from a slope meter 31 (FIG. 7), such as a Precision Pendulum, Standard Model CP17-0601-1, manufactured by Humphrey Inc., of 9212 Balboa Ave., San Diego, Calif. 92123, U.S.A..

As shown and described below in conjunction with FIGS. 3 to 6, the main motive functions of the vehicle, namely, steering, transmission, acceleration and braking, are controlled by main controller 30, via linear actuators 44, controlling steering and transmission functions and, typically, servo actuators 46, for controlling acceleration and braking functions.

A typical linear actuator suitable for use in the present invention is a linear actuator bearing, catalog no. 9307-103-046, manufactured by Warner Electric Inc. of La Pierreire, 1030 Villars-Ste-Croix/Lausanne, Switzerland. Typical servo actuators suitable for use in the present invention are mentioned hereinbelow with reference to FIGS. 5 and 6.

There is also provided a relay box 48 (FIG. 2) connected to main controller 30 and through which auxiliary systems 50 are controlled. These auxiliary systems may be any conventional systems carried by combat vehicles. An example of such a system is a smoke screen system.

Reference is now made to FIGS. 3 to 6, in which the main motive functions of the vehicle are illustrated.

Figure 3:
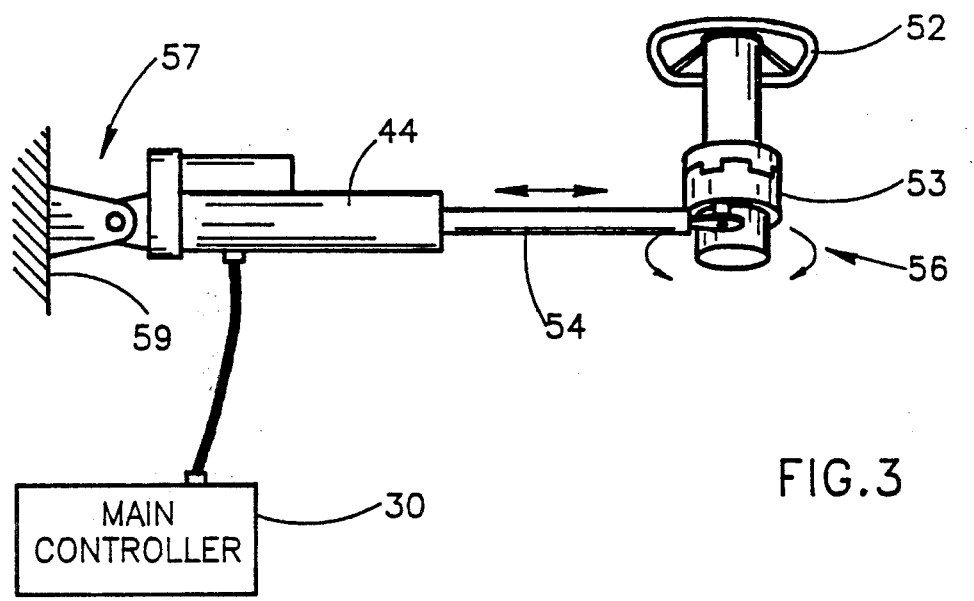
FIG. 3 is a schematic illustration of steering control apparatus constructed and operative in accordance with the present invention.

With particular reference to FIG. 3, there is shown a conventional-type steering control 52, by which the vehicle may be steered conventionally. The system of the present invention includes a linear actuator 44, for example, of the type described above, of which the piston 54 is pin connected, as shown, to a portion 56 of the steering column. An end portion 57 of the actuator is connected, as shown, to a surface 59 of the vehicle. A potentiometer (not shown) is provided in association with the linear actuator so as to monitor the load across the motor thereof and to provide data corresponding thereto to the main controller 30.

According to the commands transmitted by the operator to the vehicle mounted unit, and according to the input from the navigational system 42 (FIG. 2), the main controller 30 operates the linear actuator so as to cause movement of the piston in a selected direction, thereby causing suitable rotation of the steering column.

An electromagnetic clutch 53 is provided for selectable connection of the linear actuator 44 to the steering system. When the vehicle mounted unit 14 is activated, so as to be switched to a remote controlled mode of operation, the vehicle steering system is connected, via clutch 53, to the linear actuator apparatus 44. Accordingly, clutch 53 is operative to disconnect the steering system from the linear actuator apparatus when the vehicle mounted unit is deactivated, so as to permit conventional steering of the vehicle.

Figure 4:
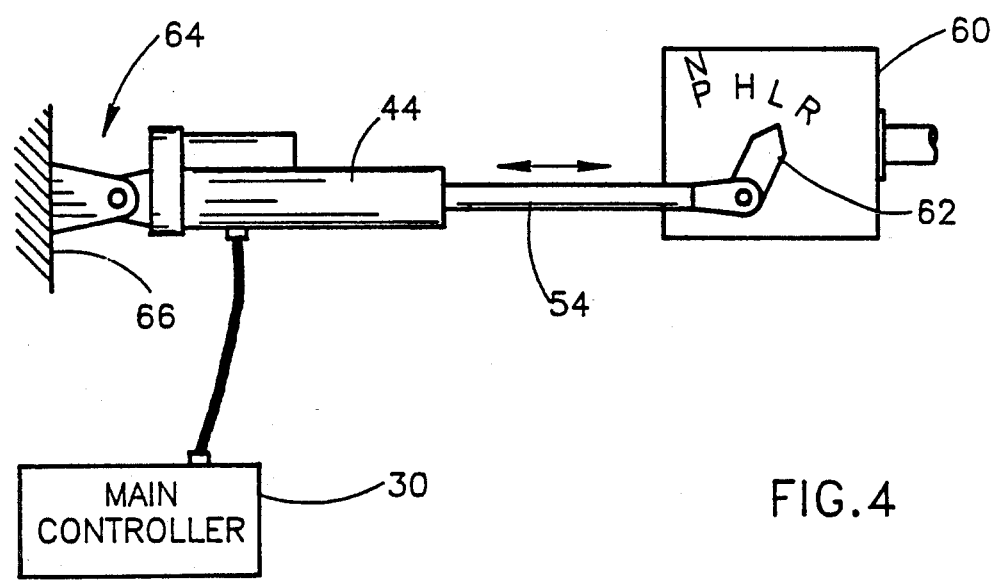
FIG. 4 is a schematic illustration of gear control apparatus constructed and operative in accordance with the present invention.

With particular reference now to FIG. 4, there is shown a transmission box 60 having a conventional gear selector lever 62. The system of the present invention includes a linear actuator 44, for example, of the type described above, of which the piston 54 is pin connected, as shown, to the gear selector lever 62. An end portion 64 of the actuator is connected, as shown, to a surface 66 of the vehicle. A potentiometer (not shown) is provided in association with the linear actuator so as to monitor the load across the motor thereof and to provide data corresponding thereto to the main controller 30.

The main controller 30 includes, inter alia, a program which governs the selection of gears, taking into account a number of factors, including the torque on the vehicle engine. According to pre-programmed criteria, therefore, the main controller 30 may 'decide' that it is necessary to switch gears, in which case it operates the linear actuator to cause movement of the piston in a selected direction, thereby causing the gear selector to be moved to engage a selected gear.

Figure 5:
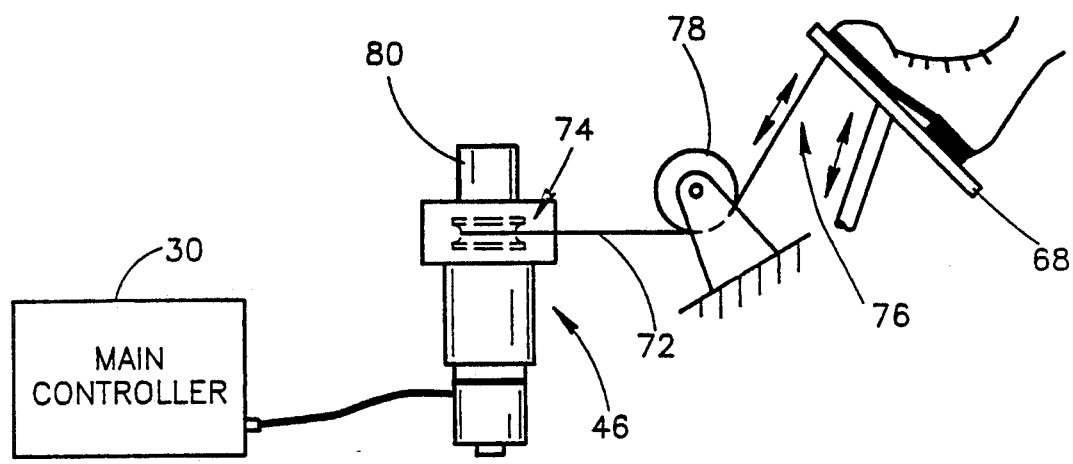
FIG. 5 is a schematic illustration of acceleration control apparatus constructed and operative in accordance with the present invention.

With particular reference now to FIG. 5, there is shown a conventional accelerator pedal 68. The main controller 30 is connected to the accelerator pedal 68 via a gear motor, referenced generally 46, and a cable 72, a first end 74 of the cable being attached to a pulley arranged for rotation by the gear motor and a second end portion 76 of the cable being attached to the accelerator pedal. The cable extends across a pulley 78 such that second end portion 76 is aligned in a direction generally parallel to the direction of movement of the pedal. According to an alternative embodiment, however, the pulley 78 is not provided.

A typical gear motor 46 suitable for use in the shown system is a servo actuator, model no. HT-20-3803, manufactured by Harmonic Drive Systems Inc., of 5 Blackhorse Way, Horsham, West Sussex RH121NU, England.

According to programmed criteria, including the speed at which the operator seeks to operate the vehicle, the main controller 30 is operative to activate the gear motor 46 either to depress the accelerator pedal or to permit return thereof. A potentiometer 80 is provided in association with the gear motor to monitor the load across the motor and to provide data corresponding thereto to the main controller 30. The load, it will be appreciated, corresponds to the tension of the cable, which in turn, corresponds to the position of the pedal and, therefore, the amount of fuel being permitted to pass to the engine.

Figure 6:
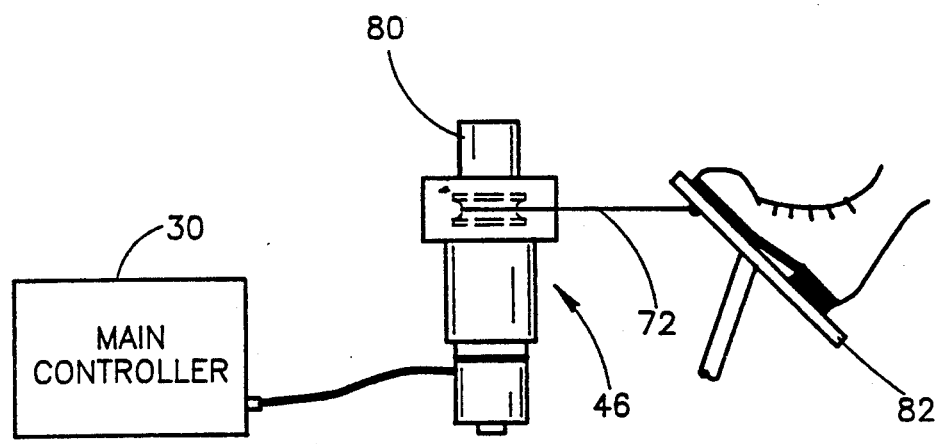
FIG. 6 is a schematic illustration of brake control apparatus constructed and operative in accordance with the present invention.

Reference is now made briefly to FIG. 6, in which there is shown a system that is generally similar to that of FIG. 5, except that the present system is a brake control system and the pedal illustrated is, therefore, a brake pedal, referenced 82. A typical gear motor 46 suitable for use in the shown system is a servo actuator, model no. HT-25-5013, also manufactured by Harmonic Drive Systems Inc.. Although a pulley system, such as employed with the cable of the acceleration system of FIG. 5, is not provided in the shown embodiment, according to an alternative embodiment, such a system may be provided.

According to predetermined criteria, including the speed at which the operator seeks to operate the vehicle, the main controller 30 is operative to activate the gear motor 46 either to depress the brake pedal so as to brake the vehicle, or to release the pedal. A potentiometer 80 is provided in association with the gear motor to monitor the load across the motor and to provide data the main controller 30 corresponding thereto. The load, it will be appreciated, corresponds to the tension of the cable, which, in the present system, corresponds to the position of the pedal and, therefore, the amount of braking being applied.

It will be appreciated, therefore, that once the operator has programmed the required speed of the vehicle and the route which the vehicle is to travel, the main controller 30 operates the various motive functions, as described above with reference to FIGS. 3 to 6, substantially independently of the operator.

Reference is now made to FIGS. 7A, 7B, 8, 9A and 7B, in which are respectively shown the hardware, the communications system and the software employed in the present invention, in block diagram form. By use of e.g. a keyboard and manual control unit 16 (FIG. 2), both forming part of operator control unit 17 (FIG. 7), an operator can call up data on video monitor 24 to assess the present state of operations of the vehicle. Appropriate software, shown schematically at block 84 in FIG. 9B, enables access of the required data via main communications system 18 and display of the data on the video monitor.

Once the operator has entered control signals via the control unit 16 (FIG. 2), to achieve selected operation of the vehicle, these signals are transmitted to the vehicle mounted unit 14 (FIG. 2), typically in the form of radio signals, via communications server 85 (FIG. 7A) and a telemetry transmitter 86, typically model T-105 U, manufactured by Aydin Vector Division of Newtown, Pa., 18940, U.S.A..

Although, according to the present embodiment of the invention, the communications system is RF (radio frequency) based, this is for example only. According to an alternative embodiment of the invention, the communications system could be an optical system, in which there would be provided, for example, an optical fiber receiver-transmitter 88 (FIG. 1) mounted, as shown, on the vehicle 10.

Figure 7A:
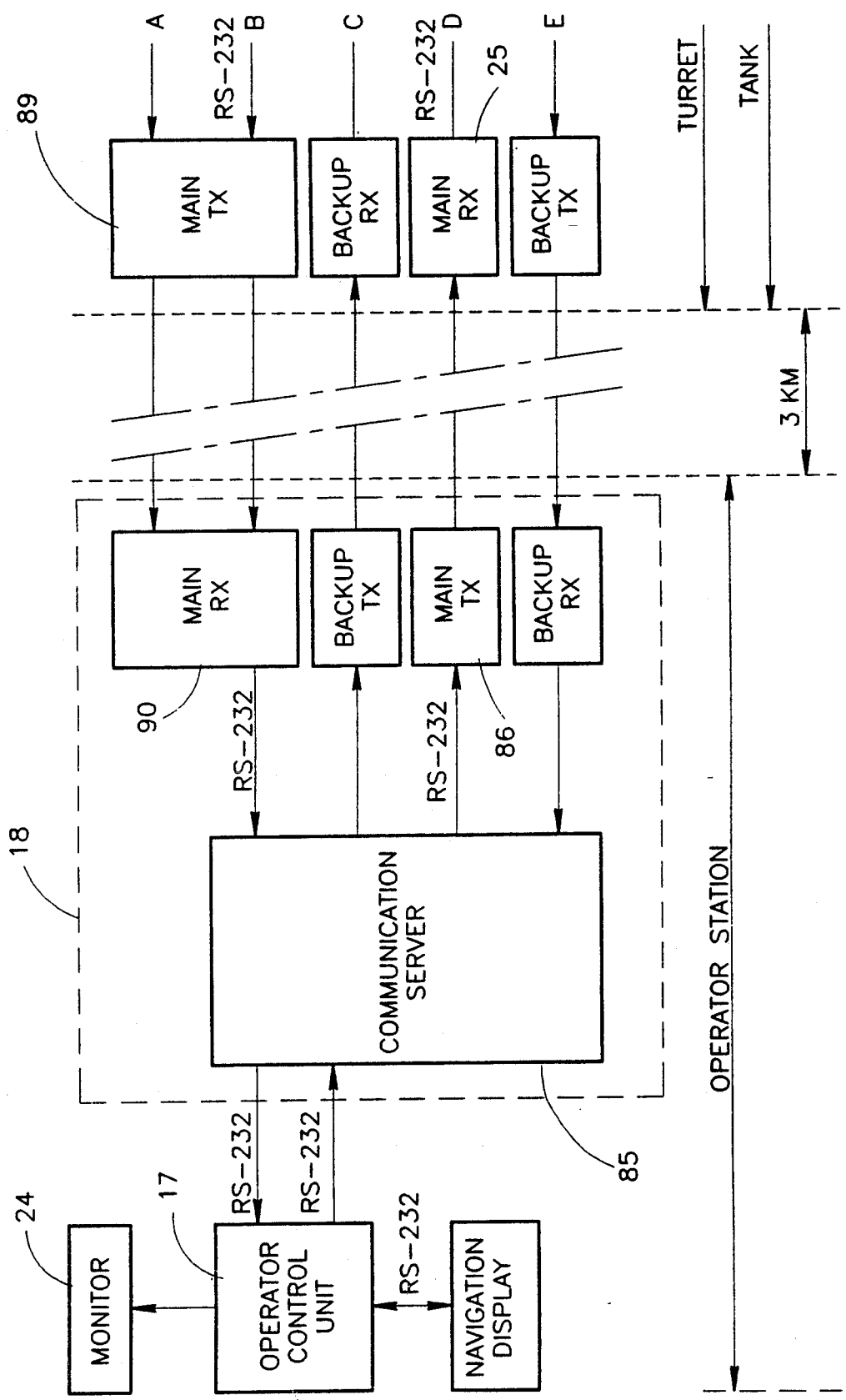
Figure 8:
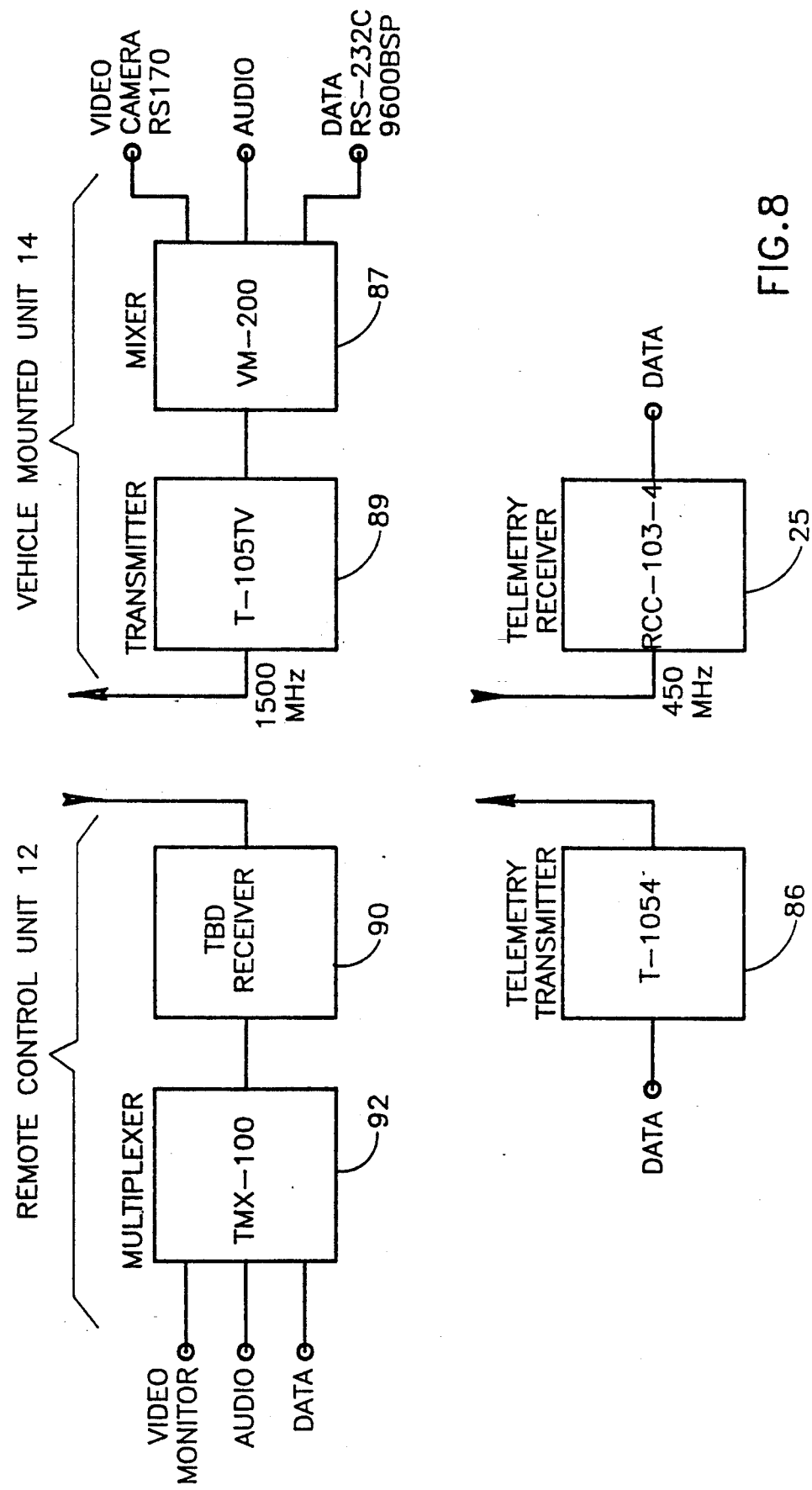
FIG. 8 is a block diagram representation of a typical communications system employed in the system of the present invention.

Signals transmitted by transmitter 86 over a range of, typically, up to about 3 km, are received by receiver 25 (FIGS. 1, 7A, and 8). A typical receiver is model RCC-103-4, also manufactured by Aydin Vector.

The control signals are distributed within the vehicle mounted unit 14 to turret controller 28 (FIGS. 2 and 7B) and main controller 30 (FIGS. 2 and 7B). Main controller 30 includes a main computer 8086 and a vehicle interface controller 8051.

Video, audio and data information gathered by various described vehicle mounted apparatus is input into a mixer 87 (FIG. 8), such as a VM-200 audio subcarrier/video mixer, manufactured by Aydin Vector. The information is then transmitted from the vehicle mounted unit via a main transmitter, referenced 89, such as a T-105-TV Video Transmitter, manufactured by Aydin Vector.

The information transmitted from the vehicle mounted unit 14 to the remote control unit 12, is received by a receiver 90, such as a TBD video receiver, manufactured by Aydin Vector, and is decoded by use of a multiplexer 92 (FIG. 8), such as the TMX-100 Multiplex System, also manufactured by Aydin Vector. The decoded information is then provided as output in the form of video, audio and data information.

It will be appreciated by those skilled in the art that although the communications system shown in FIGS. 7 and 8 is an integrated three-channel system employing a mixer and multiplexer for respectively encoding and decoding the combined video, audio and data information, a suitable nonintegrated system may be used wherein, for example, the video, audio and data information are transmitted by separate means.

Figure 9A:
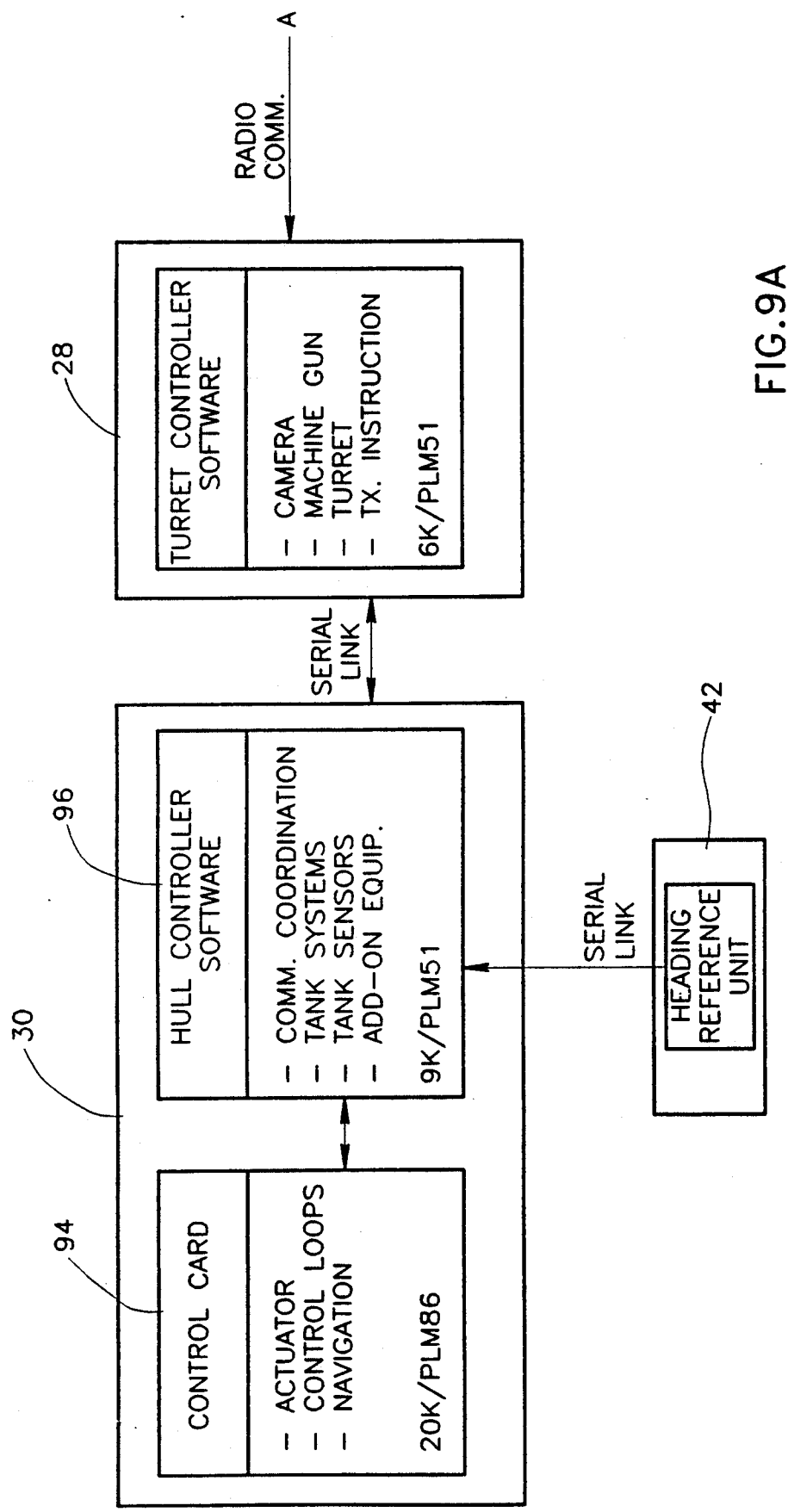
FIGS. 9A–9B collectively constitute a block diagram representation of software employed in an embodiment of the invention.
Figure 9B:
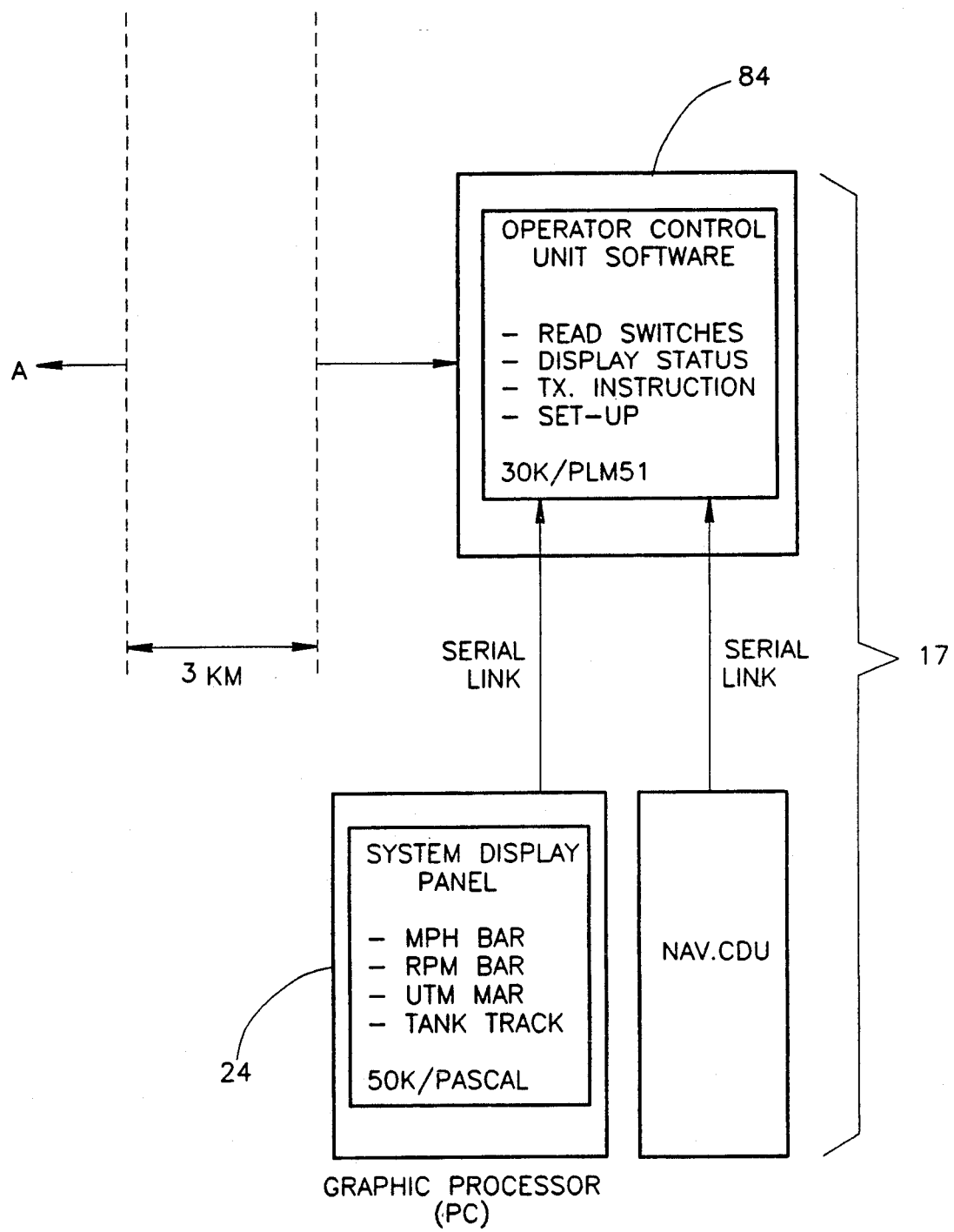

Referring additionally to FIGS. 9A and 9B, each software block bears a reference numeral corresponding to the reference numeral of the piece of hardware in FIGS. 7A and 7B with which it is employed.

Figure 10:
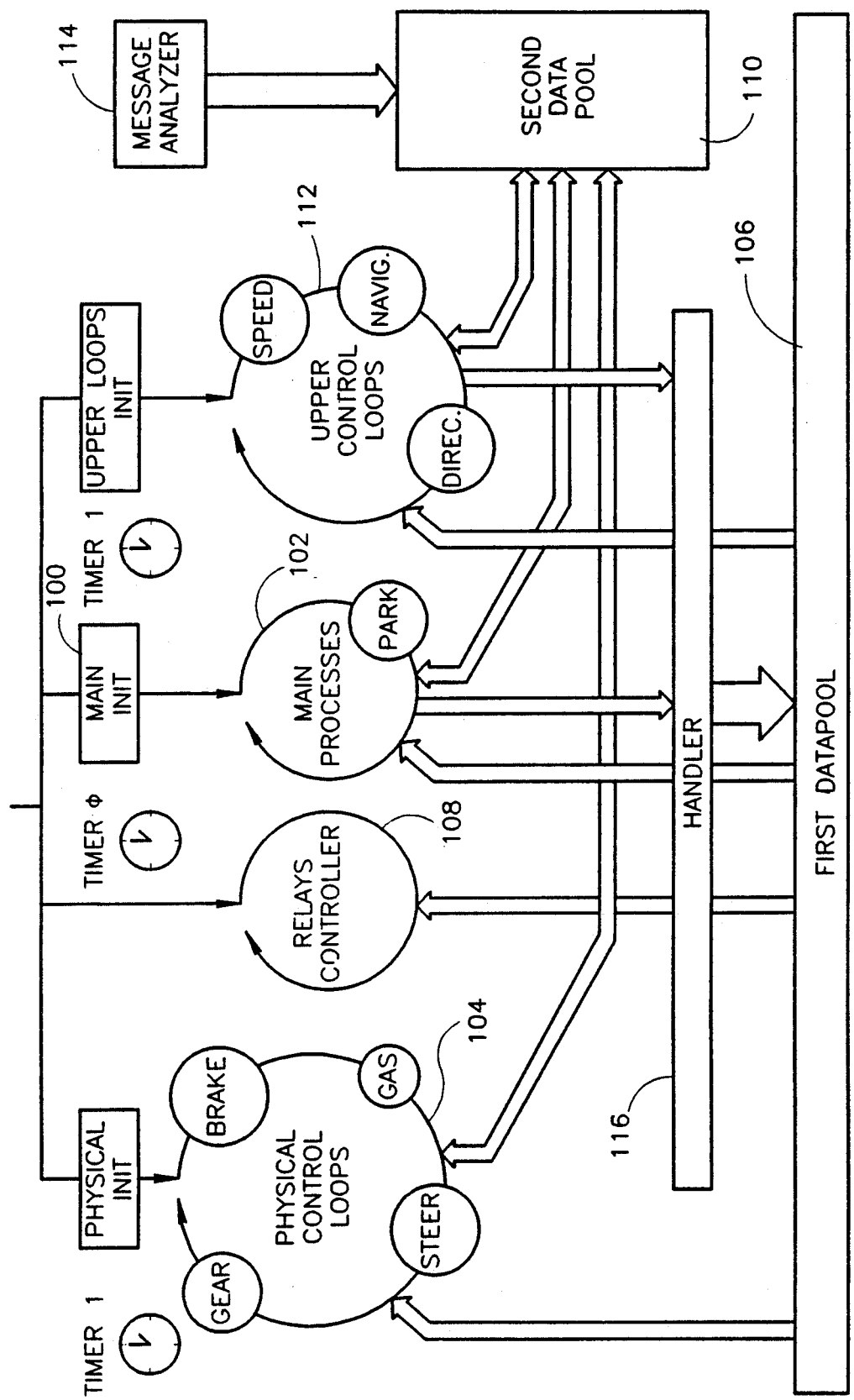
FIG. 10 is a diagram showing exemplary software routines employed in the vehicle mounted unit of the present invention.

Referring now to FIG. 10, there is shown a diagrammatic representation of exemplary control routines of the main controller 30. These routines enable control and monitoring of the vehicle by the main controller 30 as will be appreciated from the ensuing description.

Depicted at 100 is an initialization routine. Processes 102 enable coordination of the vehicle functions, such as required when performing any main process, such as maneuvering of the vehicle. Shown at 106 is a first data pool which contains data concerning system requirements. The data in first data pool 106 receives updates from various routines operating in parallel with the main processes 102.

Physical control loops 104 and relays controller routine 108, employed by relay box 48 (FIG. 2), operate in parallel with the main processes 102, and receive their operational commands via first data pool 106.

Shown at 110 is a second data pool which receives continuous updates of functional data from the various sensory devices associated with the vehicle functions. The second data pool is updated from an upper control loops routine 112, which provides data regarding speed, navigation and direction of the vehicle. The second data pool 110 also receives data updates from the main processes 102, the physical control loops routine 104 and from a message analyzer routine 114. The message analyzer routine is operative to receive data messages which may either be signals provided directly by the operator regarding any selected vehicle function, or signals from sensors indicating the status of the vehicle systems.

A typical sequence is as follows:

The message analyzer 114 'tells' the second data pool 110 that the required speed of the vehicle is currently a first speed. Every so often, e.g. at intervals of one hundred milliseconds, the upper control loops routine 112 'looks' at the second data pool for relevant data. Upon 'seeing' the required speed, routine 112 'checks' the actual speed of the vehicle, also via the second data pool 110, the actual speed having been received thereby from the message analyzer 114.

The upper control loops routine 112 calculates the required change in the speed of the vehicle and, therefore, the required change in the rate at which fuel is supplied to the vehicle engine. A command is then sent out from routine 112 to a handling routine 116 to adjust the gas pedal by a certain amount. The handling routine 116, which is also receiving various other commands for different vehicle systems, allocates a priority to the command concerning the gas pedal and selects an appropriate stage at which to pass this command to linear actuator 44 of the acceleration control system (FIG. 5) via the first data pool 106 and the physical control loops routine 104.

It will be appreciated by persons skilled in the art that the scope of the present invention is not limited to what has been specifically shown and described hereinabove, by way of example. The scope of the present invention is limited, rather, solely by the claims, which follow.

We claim:

1. A remote control system for a combat vehicle comprising:

remote control apparatus for providing signals to the vehicle for controlling a plurality of vehicle functions conventionally controlled by personnel riding in the vehicle;

selectably actuable vehicle mounted apparatus for receiving signals from said remote control apparatus and for operating said plurality of vehicle functions in accordance with said signals; and electrical switching means for selectably deactivating said vehicle mounted apparatus so as to enable non-remote control of the vehicle functions, and wherein said remote control apparatus comprises:

means for transmitting said signals to said vehicle mounted apparatus for operating selected ones of said plurality of vehicle functions;

signal receiving means; and means, associated with said signal receiving means, for providing an output indication of operation of the selected vehicle functions, said vehicle mounted apparatus comprising:

means for operating each of said plurality of vehicle functions;

computer means, associated with said means for operating, for monitoring each of said plurality of vehicle functions; and means for receiving and processing said signals transmitted from said remote control apparatus and for providing first output signals, in accordance with said transmitted signals, to said means for operating so as to cause operation of the selected vehicle functions, said means for receiving and processing also being operative to communicate with said computer means and further comprising means for providing second output signals, indicative of operation of the selected vehicle functions, to said signal receiving means of said remote control apparatus.

2. A system according to claim 1, and wherein said vehicle mounted apparatus also comprises:

visual surveillance means for surveying an area visible from the combat vehicle; and means, associated with said visual surveillance means, for transmitting a video output, said remote control apparatus also comprising:

means for receiving said video output; and means, associated with said means for receiving said video output for providing a visual display corresponding to said video output.

3. A system according to claim 2, and also including means for navigating the vehicle along a selected path.

4. A system according to claim 1, and wherein said means for transmitting of said remote control apparatus comprises means for transmitting radio signals, and said means for receiving and processing of said vehicle mounted apparatus comprises means for receiving and processing radio signals.

5. A system according to claim 1, and wherein said means for operating said predetermined plurality of vehicle functions comprises:

electrical switching means for operating motive functions for the vehicle; and means for operating auxiliary function of the vehicle.

6. A system according to claim 1, and wherein said means for providing second output signals of said means for receiving and processing comprises means for transmitting radio signals, and said signal receiving means of said remote control apparatus comprises means for receiving radio signals.

7. A remotely controllable combat vehicle system including:

a combat vehicle, and a remote control system for a combat vehicle and comprising:

remote control apparatus for providing signals to said vehicle for controlling a plurality of vehicle functions conventionally controlled by personnel riding in said vehicle selectably actuable vehicle mounted apparatus for receiving signals from said remote control apparatus and for operating said plurality of vehicle functions in accordance with said signals; and electrical switching means for selectably deactivating said vehicle mounted apparatus so as to enable non-remote control of said vehicle functions, and wherein said remote control apparatus comprises:

means for transmitting said signals to said vehicle mounted apparatus for operating selected ones of said plurality of vehicle functions;

signal receiving means; and means, associated with said signal receiving means, for providing an output indication of operation of the selected vehicle functions, said vehicle mounted apparatus comprising:

means for operating each of said plurality of vehicle functions;

computer means, associated with said means for operating, for monitoring each of said plurality of vehicle functions; and means for receiving and processing said signals transmitted from said remote control apparatus and for providing first output signals, in accordance with said transmitted signals, to said means for operating so as to cause operation of the selected vehicle functions, said means for receiving and processing also being operative to communicate with said computer means and further comprising means for providing second output signals, indicative of operation of the selected vehicle functions, to said signal receiving means of said remote control apparatus.

8. A vehicle system according to claim 7, and wherein said vehicle mounted apparatus also comprises:

visual surveillance means for surveying an area visible from said combat vehicle; and means, associated with said visual surveillance means, for transmitting a video output, said remote control apparatus also comprising:

means for receiving said video output; and means, associated with said means for receiving said video output, for providing a visual display corresponding to said video output.

9. A vehicle system according to claim 8, and wherein said remote control system also includes means for navigating said vehicle along a selected path.

10. A vehicle system according to claim 7, and wherein said means for transmitting of said remote control apparatus comprises means for transmitting radio signals, and said means for receiving and processing of said vehicle mounted apparatus comprises means for receiving and processing radio signals.

11. A vehicle system according to claim 7, and wherein said means for operating said predetermined plurality of vehicle functions comprises:

means for operating motive functions of said vehicle; and means for operating auxiliary functions of said vehicle.

12. A vehicle according to claim 7, and wherein said means for providing second output signals of said means for receiving and processing comprises means for transmitting radio signals, and said signal receiving means of said remote control apparatus comprises means for receiving radio signals.

* * * * *